US012323770B2

(12) United States Patent
Gram et al.

(10) Patent No.: US 12,323,770 B2
(45) Date of Patent: Jun. 3, 2025

(54) HEARING DEVICE COMPRISING A MODULE

(71) Applicant: GN Hearing 2 A/S, Ballerup (DK)

(72) Inventors: Hans Erik Gram, Ballerup (DK); Birol Akdeniz, Ballerup (DK); Kim Fälling Andersen, Ballerup (DK)

(73) Assignee: GN Hearing 2 A/S, Ballerup (DK)

( * ) Notice: Subject to any disclaimer, the term of this patent is extended or adjusted under 35 U.S.C. 154(b) by 0 days.

(21) Appl. No.: 18/532,142

(22) Filed: Dec. 7, 2023

(65) Prior Publication Data

US 2024/0129677 A1 Apr. 18, 2024

Related U.S. Application Data

(63) Continuation of application No. 17/674,777, filed on Feb. 17, 2022, now Pat. No. 11,937,049.

(30) Foreign Application Priority Data

Mar. 10, 2021 (DK) .......................... PA 2021 70109

(51) Int. Cl.
*H04R 25/00* (2006.01)

(52) U.S. Cl.
CPC ......... *H04R 25/554* (2013.01); *H04R 25/604* (2013.01); *H04R 2225/021* (2013.01)

(58) Field of Classification Search
CPC ................ H04R 1/1041; H04R 1/1091; H04R 2225/021; H04R 2225/51; H04R 2225/55;
(Continued)

(56) References Cited

U.S. PATENT DOCUMENTS

2007/0149237 A1 6/2007 Russell et al.
2009/0238386 A1 9/2009 Usher et al.
(Continued)

FOREIGN PATENT DOCUMENTS

CN 106100685 11/2016
CN 110266330 9/2019
(Continued)

OTHER PUBLICATIONS

Non-Final Office Action for U.S. Appl. No. 17/674,777 dated Jun. 26, 2023.
(Continued)

*Primary Examiner* — Phylesha Dabney
(74) *Attorney, Agent, or Firm* — Vista IP Law Group, LLP

(57) ABSTRACT

A hearing device comprises an input transducer; a signal processor; an output transducer; a transceiver configured for wireless data communication, an antenna for electromagnetic field emission and electromagnetic field reception, the antenna coupled to the transceiver, and a module. The module comprises a transceiver interface coupled to the transceiver, an antenna interface coupled to the antenna, a transmission path configured for sending signals from the transceiver to the antenna, the transmission path comprising a transmission amplifier, a reception path configured for sending signals from the antenna to the transceiver, the reception path comprising a reception amplifier, and a bypass path configured for sending signals between the transceiver and antenna by bypassing the transmission path and the reception path.

22 Claims, 3 Drawing Sheets

(58) Field of Classification Search
CPC ............ H04R 2225/61; H04R 2460/03; H04R 25/554; H04R 25/604; H04R 3/00
USPC .......................................................... 381/312
See application file for complete search history.

(56) References Cited

U.S. PATENT DOCUMENTS

| | | | | |
|---|---|---|---|---|
| 2013/0210500 | A1 | 8/2013 | Graham | |
| 2014/0002187 | A1 | 1/2014 | Mcpartlin et al. | |
| 2016/0276983 | A1 | 9/2016 | Vaillancourt | |
| 2018/0206044 | A1 | 7/2018 | Ungstrup et al. | |
| 2020/0053940 | A1 | 2/2020 | Ruppel et al. | |
| 2020/0220255 | A1 | 7/2020 | Cetinoneri et al. | |
| 2022/0232329 | A1 * | 7/2022 | Shriner | H04R 25/02 |

FOREIGN PATENT DOCUMENTS

| | | |
|---|---|---|
| CN | 111 711 466 | 9/2020 |
| EP | 1826914 | 8/2007 |
| WO | WO 2014/094858 | 6/2014 |

OTHER PUBLICATIONS

Notice of Allowance for U.S. Appl. No. 17/674,777 dated Nov. 15, 2023.
Examination report dated Sep. 10, 2021 for Danish patent application No. PA 2021 70109.
Examination report dated Apr. 4, 2022 for Danish patent application No. PA 2021 70109.
Extended European Search Report dated Nov. 11, 2021 for EP Patent Appln. No. 21161906.9.
English Translation of CN 106100685.
English Translation of CN 110266330.
English Translation of CN 111 711 466.
EP Office Action for EP 21161906.9 dated Apr. 18, 2024.

* cited by examiner

HEARING DEVICE COMPRISING A MODULE

RELATED APPLICATION DATA

This application is a continuation of U.S. patent application Ser. No. 17/674,777, filed on Feb. 17, 2022, pending, which claims priority to, and the benefit of, Danish Patent Application No. PA 2021 70109 filed Mar. 10, 2021. The entire disclosures of the above applications are expressly incorporated by reference herein.

FIELD

The present disclosure relates to a hearing device comprising a module.

BACKGROUND

Nowadays, hearing devices are typically connected to a smartphone in a wireless manner e.g. via a Bluetooth connection. Such wireless connection between the hearing device and the smartphone allows the user e.g. to stream music from the smartphone to the hearing device or to have a voice communication between the hearing device and the smartphone. However, the user may experience a weak signal link e.g. when the user places the smartphone in a bag, a back pocket or a front pocket. In such cases, it may e.g. not be possible to stream music from the smartphone to the hearing device or to make a phone call. Hence, the user may need to take out the smartphone from the bag, the back pocket or the front pocket and to restart an application or the connection. Therefore, there is still a need for an improved hearing device that addresses the abovementioned problems.

SUMMARY

According to a first aspect, disclosed is a hearing device. The hearing device is configured to be arranged at a user's ear. The hearing device comprises an input transducer. The input transducer generates one or more input signals based on a received audio signal. The hearing device comprises a signal processor. The hearing device comprises an output transducer. The output transducer is coupled to an output of the signal processer for conversion of an output signal from the signal processor into an output signal. The hearing device comprises a transceiver. The transceiver is coupled to the signal processor. The transceiver is configured for wireless data communication. The hearing device comprises an antenna for emission and reception of an electromagnetic field. The antenna is coupled to the transceiver. The hearing device comprises a module. The module comprises a transceiver interface. The transceiver interface is coupled to the transceiver. The module comprises an antenna interface. The antenna interface is coupled to the antenna. The module comprises a transmission (TX) path. The TX path is configured for sending signals from the transceiver to the antenna. The TX path comprises a TX amplifier. The module comprises a reception (RX) path. The RX path is configured for sending signals from the antenna to the transceiver. The RX path comprises a RX amplifier.

According to a second aspect, disclosed is a hearing device. The hearing device is configured to be arranged at a user's ear. The hearing device comprises an input transducer. The input transducer generates one or more input signals based on a received audio signal. The hearing device comprises a signal processor. The hearing device comprises an output transducer. The output transducer is coupled to an output of the signal processer for conversion of an output signal from the signal processor into an output signal. The hearing device comprises a transceiver. The transceiver is coupled to the signal processor. The transceiver is configured for wireless data communication. The hearing device comprises an antenna for emission and reception of an electromagnetic field. The antenna is coupled to the transceiver. The hearing device comprises a module. The module comprises a transceiver interface. The transceiver interface is coupled to the transceiver. The module comprises an antenna interface. The antenna interface is coupled to the antenna. The module comprises a transmission (TX) path. The TX path is configured for sending signals from the transceiver to the antenna. The TX path comprises a TX amplifier. The module comprises a reception (RX) path. The RX path is configured for sending signals from the antenna to the transceiver. The RX path comprises a RX amplifier. The module comprises a bypass path. The bypass path is configured for sending signals between the transceiver and antenna by bypassing the TX path and RX path.

The hearing device as disclosed allows for sending signals between the hearing device and an external device, an electronic device, a peripheral device or an auxiliary device, such as a smartphone. In the following, the term smartphone will be used, however it is understood that this may be any device wirelessly connected with the hearing device.

The hearing device as disclosed allows for sending the signals from the hearing device to the smartphone via the TX path. The signal sent from the hearing device to the smartphone, via the TX path, is improved, such as amplified, by the TX amplifier of the TX path. In addition, the hearing device as disclosed allows for sending the signal from the smartphone to the hearing device via the RX path. The signal sent from the smartphone to the hearing device, via the RX path, is improved, such as amplified, by the RX amplifier of the RX path. The TX path and the RX path may be used when the signal link is weak. Hence, the TX path and the RX path improve a weak signal link e.g. when the user has placed the smartphone in a bag, a back pocket or a front pocket i.e. when the smartphone is not at the ear of the user or close to the ear of the user. Thereby, the user may not need to e.g. take out the smartphone from the bag, the back pocket or the front pocket. In addition, the user may not need to restart an application or restart the connection between the hearing device and the smartphone e.g. the Bluetooth connection. Thereby, the TX and RX paths of the disclosed hearing device allow for a strong and reliable signal link between the hearing device and the smartphone even when e.g. the smartphone is placed in the user's bag, back pocket or the front pocket.

In addition, the hearing device as disclosed allows for bypassing the TX path and the RX path via the bypass path. Bypassing the TX path and the RX path via the bypass path may be performed when the signal link is strong. For instance, the bypass path is selected when the user has the smartphone in his/her hand. Thereby, the bypass path allows for saving power of the hearing device. When using the bypass path, the TX amplifier and/or the RX may be configured to be powered down.

In overall, the hearing devices as disclosed provides a reliable and robust constant communication e.g. a strong Bluetooth signal link between the hearing device and the smartphone in both directions i.e. from the hearing device to the smartphone and vice versa. Thereby, the hearing device as disclosed provides a reliable, robust, efficient and user-friendly hearing device. An example of advantages of the disclosed hearing device is that a battery of the hearing device may not need to be charged or replaced as frequently as the conventional hearing devices. Another example of advantages of the disclosed hearing device is that the user of the hearing device may continue using the hearing device while not having the smartphone in the hand. For instance, the user of the hearing device may continue listening to music while having the smartphone in a pocket and running. Thus, the hearing device provides improved wireless communication capabilities.

The hearing device is configured to be arranged at the user's ear. The hearing device is configured to be worn at the user's ear. The hearing device may be arranged inside the user's ear. The hearing device may be arranged behind the user's ear. The hearing device may be arranged in the user's ear. The hearing device may be arranged at a close vicinity of the user's ear. The hearing device may have a component adapted to be arranged behind the user's ear and a component adapted to be arranged in the user's ear.

The hearing device comprises an input transducer. The input transducer generates one or more input signals based on a received audio signal. An example of an input transducer is a microphone.

The hearing device comprises a signal processor. The signal processor may be configured for processing the one or more input signals. The signal processor may process signals such as to compensate for the user's hearing loss or hearing impairment, such compensation may involve frequency dependent amplification of the input signal based on the user's hearing loss. The signal processor may provide a modified signal.

The hearing device comprises an output transducer. The output transducer is coupled to an output of the signal processer for conversion of an output signal from the signal processor into an output signal. Examples of the output transducer are receivers, such as a speaker, for generating an audio output signal or a cochlear implant for generating an electric stimulus signal to the auditory nerve of the user.

The hearing device comprises a transceiver. The transceiver is coupled to the signal processor. The transceiver is configured for wireless data communication. The transceiver is configured for communication with a connected device e.g. a smartphone. Examples of transceivers are a radio or wireless communication unit and a transmitter/receiver pair (T/R).

The hearing device comprises an antenna for emission and reception of an electromagnetic field. The antenna is coupled to the transceiver. The antenna is configured for communication with a connected device e.g. a smartphone.

The hearing device may comprise a power source, such as a replaceable battery or a rechargeable battery. The hearing device may comprise a power management unit. The power management unit may be provided for controlling the power provided from the power source to the signal processor, the output transducer, the input transducer, and the transceiver. Furthermore, the hearing device may comprise a housing or a shell. The power source and the power management unit of the hearing device may be arranged in the housing, e.g. in a compartment or in a frame in the housing.

The hearing device comprises a module. The module may be a front-end module. The module comprises a transceiver interface coupled to the transceiver. The transceiver interface may be an input/output of the module. The module comprises an antenna interface coupled to the antenna. The antenna interface may be an input/output of the module.

The module comprises a transmission (TX) path. The TX path is configured for sending signals from the transceiver to the antenna. The TX path comprises a TX amplifier. The TX Path is configured to send a radio frequency (RF) signal, to the antenna for transmission via the wireless connection. The TX path may be configured to block DC signals. Examples of RF signals are audio signals such as the user's voice picked up by the input transducer e.g., a microphone in the hearing device to be sent to the smartphone e.g., during a phone call, where the hearing device is used as a headset and the smartphone is in a pocket, bag or hand of the user i.e., not at the ear of the user.

The module comprises a reception (RX) path. The RX path is configured for sending signals from the antenna to the transceiver. The RX path comprises a RX amplifier. The RX Path is configured to send a RF signal, received by the antenna via the wireless connection to the transceiver. The RX Path may be configured to block DC signals. Examples of RF signals are audio signals such as a far-end caller's voice to be sent to the hearing device from the smartphone e.g. during a phone call, when the hearing device is used as a headset and the smartphone is in a pocket, bag or hand of the user (not at the ear of the ear). Another example of audio signals, sent via the antenna to the hearing device, is music streamed from the smartphone to the hearing device when the hearing device is used as a headset.

The module comprises a bypass path. The bypass path is configured for sending signals between the transceiver and antenna by bypassing the TX path and RX path. The bypass path is configured for sending signals from the transceiver to the antenna and from the antenna to the transceiver i.e. both ways. The bypass path is selected when the signal link between the transceiver and the antenna is strong. The bypass path allows for saving power of the hearing device. The bypass path provides a power saving mode. The bypass path typically consumes 4 uA compared to 12 mA of the TX and RX paths. Thereby, the bypass path consumes about a factor of 3000 less power than the TX and RX paths.

The hearing device may be connected to a plethora of electronic devices or accessories, that can be either body-worn or placed in the user's proximity, and hence to the internet as part of the so-called internet of things (IoT). The 2.4 GHz ISM band may be preferred due to the presence of many harmonized standards for low-power communications, such as BLE or ZigBee, its worldwide availability for industrial use, and the trade-off between power consumption and range that can be achieved. Thus, the 2.4 GHz band may be used for hearing device communication.

Now, the 1.6 GHz ISM band may also be made available for use with hearing devices. In order to achieve a good on-body performance, the antenna may exhibit optimal radiation efficiency, bandwidth, polarization, and radiation pattern, while the volume available for the design is reduced, as most times space comes at a premium in wearable devices such as in hearing aid, in particular in ITE (In-The-Ear) hearing aids.

Furthermore, mass production and industrial design needs may demand the antenna to be as well low-profile, lightweight, and inexpensive to manufacture. Various overall constraints may be relevant. The efficiency may be jeopardized by the proximity of the antenna to the human head, as the body tissues have high losses around 2.4 GHz due to the high water content. This may critically impact the overall performance given the magnitude of the drop in efficiency and the fact that the hearing device radios may operate in ultra-low-power regime. Another issue threatening antenna efficiency is the little volume available for the design, as this necessarily brings the antenna in close physical, hence, electrical as well, proximity of other parts of the device, with a strong likelihood of coupling to them. A large bandwidth is as well hard to achieve for an electrically small antenna due to its fundamental limits. The bandwidth may cover at least the whole 2.4 GHz ISM band, such as a bandwidth of 2.45 GHz+/−2.5%, such as 2.45 GHz+/−5% and/or a bandwidth around 1.6 GHz, such as a bandwidth of 1.6 GHz+/−2.5%, such as 1.6 GHz+/−5%, but a larger bandwidth may help to compensate for the detuning of the antenna caused by the body, that varies across users.

The transceiver is configured for wireless communication. The transceiver may comprise one or more wireless communication units. The transceiver is interconnected with the antenna for emission and reception of an electromagnetic field. The wireless communication unit may comprise a transmitter, a receiver, a transmitter/receiver pair, such as a transceiver, a radio, a radio circuit, etc. The wireless communication unit may be configured for communication using any protocol as known for a person skilled in the art, including Bluetooth, including Bluetooth Low Energy, Bluetooth Smart, etc., WLAN standards, manufacture specific protocols, such as tailored proximity antenna protocols, such as proprietary protocols, such as low-power wireless communication protocols, such as CSR mesh, etc.

The antenna may be the interface between radio waves propagating through space and electric currents moving in metal conductors, used with a communication unit, such as a transmitter or receiver. In transmission, a radio transmitter may supply an electric current to the antenna's terminals, and the antenna may radiate the energy from the current as electromagnetic waves (radio waves). In reception, the antenna may intercept some of the energy of a radio wave in order to produce an electric current at its terminals, that is applied to a receiver to be amplified.

The antenna may be an array of conductors (elements), electrically connected to the receiver or transmitter. During transmission, the oscillating current applied to the antenna by a transmitter may create an oscillating electric field and magnetic field around the antenna elements. These time-varying fields may radiate energy away from the antenna into space as a moving transverse electromagnetic field wave, a radio wave. Conversely, during reception, the oscillating electric and magnetic fields of an incoming radio wave may exert force on the electrons in the antenna elements, causing them to move back and forth, creating oscillating currents in the antenna. The antenna may be a coil antenna, such as a magnetic antenna. The antenna may be an electric antenna.

The antennas may be designed to transmit and receive radio waves in all horizontal directions equally (omnidirectional antennas), or preferentially in a particular direction (directional or high gain antennas). The antenna may include parasitic elements, which serve to direct the radio waves into a beam or other desired radiation pattern.

The hearing device may be a headset, a hearing aid, a hearable etc. The hearing device may be an in-the-ear (ITE) hearing device, a receiver-in-ear (RIE) hearing device, a receiver-in-canal (RIC) hearing device, a microphone-and-receiver-in-ear (MaRIE) hearing device, a behind-the-ear (BTE) hearing device, an over-the-counter (OTC) hearing device etc., a one-size-fits-all hearing device etc.

The hearing device is configured to be worn by a user. The hearing device may be arranged at the user's ear, on the user's ear, in the user's ear, in the user's ear canal, behind the user's ear etc. The user may wear two hearing devices, one hearing device at each ear. The two hearing devices may be connected, such as wirelessly connected.

The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc.

The hearing device may comprise a first input transducer, e.g., a microphone, to generate one or more microphone output signals based on a received audio signal. The audio signal may be an analogue signal. The microphone output signal may be a digital signal. Thus, the first input transducer, e.g., microphone, or an analogue-to-digital converter, may convert the analogue audio signal into a digital microphone output signal. All the signals may be sound signals or signals comprising information about sound. The hearing device may comprise a signal processor. The one or more microphone output signals may be provided to the signal processor for processing the one or more microphone output signals. The signals may be processed such as to compensate for a user's hearing loss or hearing impairment. The signal processor may provide a modified signal. All these components may be comprised in a housing of an ITE unit or a BTE unit. The hearing device may comprise a receiver or output transducer or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in an ITE unit or in an earpiece, e.g. RIE unit or MaRIE unit. The hearing device may comprise more than one microphone, and the ITE unit or BTE unit may comprise at least one microphone and the RIE unit may also comprise at least one microphone.

The hearing device signal processor may comprise elements such as an amplifier, a compressor and/or a noise reduction system etc. The signal processor may be implemented in a signal-processing chip or a printed circuit board (PCB). The hearing device may further have a filter function, such as compensation filter for optimizing the output signal.

The hearing device may furthermore comprise a wireless communication unit or chip, such as a wireless communication circuit or a magnetic induction chip, for wireless data communication interconnected with an antenna, such as a radio frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be any hearing device, such as any hearing device compensating a hearing loss of a wearer of the hearing device, or such as any hearing device providing sound to a wearer, or such as a hearing device providing noise cancellation, or such as a hearing device providing tinnitus reduction/masking. The person skilled in the art is well aware of different kinds of hearing devices and of different options for arranging the hearing device in and/or at the ear of the hearing device wearer.

For example, the hearing device may be an In-The-Ear (ITE), Receiver-In-Canal (RIC) or Receiver-In-the-Ear (RIE or RITE) or a Microphone-and-Receiver-In-the-Ear (MaRIE) type hearing device, in which a receiver is positioned in the ear, such as in the ear canal, of a wearer during use, for example as part of an in-the-ear unit, while other hearing device components, such as a processor, a wireless communication unit, a battery, etc. are provided as an assembly and mounted in a housing of a Behind-The-Ear (BTE) unit. A plug and socket connector may connect the BTE unit and the earpiece, e.g. RIE unit or MaRIE unit.

The hearing device may comprise a RIE unit. The RIE unit typically comprises the earpiece such as a housing, a plug connector, and an electrical wire/tube connecting the plug connector and earpiece. The earpiece may comprise an in-the-ear housing, a receiver, such as a receiver configured for being provided in an ear of a user and/or a receiver being configured for being provided in an ear canal of a user, and an open or closed dome. The dome may support correct placement of the earpiece in the ear of the user. The RIE unit may comprise a microphone, a receiver, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

In some embodiments, the RX amplifier may be a low noise amplifier (LNA). The received signals by the antenna may be weak signals i.e. signals just above the noise. Hence, the signals by the antenna may have a low signal to noise ratio (SNR). An example of advantage of the LNA is that it may not add any noise or may add only a little noise to the received signals. Thereby, weak signals received by the antenna may be amplified by the LNA such that the noise contribution by the LNA itself may be small. In addition, the LNA has a good linearity compared to the received signals. Thereby, there is no need to arrange a filter between the LNA and the transceiver. This may in turn allow configuring the RX path in a cost-effective manner i.e., without a filter. The LNA may typically use up to 4-5 mA. The LNA may use the current only during the time of receiving signals by the antenna. Such time may typically be less than 15%, 10%, 7%, or 4% of the time of using the hearing device.

In some embodiments, the TX amplifier may be a power amplifier (PA). Thereby, the PA may amplify the signal sent from the transceiver to the antenna. The signals sent from the transceiver to the antenna may be strong. Hence, the signals sent from the transceiver to the antenna may have a high SNR. An example of advantages of the PA is its efficiency. The PA may typically use up to 12-14 mA. The PA may use the current only during the time of transmitting the signals from the transceiver to the antenna.

Such time may typically be less than 15%, 10%, 7%, or 4% of the time of using the hearing device.

In some embodiments, the TX path may comprise a filter arranged in the TX path between the TX amplifier and the antenna interface. The filter may remove harmonics generated by the PA such as second harmonic and third harmonic. For instance, in the case that the transceiver is connected to the antenna via the Bluetooth connection, the frequency of the signal is 2.4 GHz. In this case, the filter may e.g. remove second harmonics with frequency of 4.8 GHz and third harmonics with frequency of 7.2 GHz. The filter may be arranged in series with the PA. The filter may be a low pass filer. The filter may be a harmonic filter. The filter may be any other type of filter that may remove the harmonics.

In some embodiments, the module may comprise a match component at the transceiver interface. The module may comprise a match component arranged adjacent to the transceiver interface. The module may comprise a match component connected to the transceiver interface. Thereby, the match component may match the module to the transceiver. The match component may be a match.

In some embodiments, the module may comprise a first electrical switch and a second electrical switch. The first electrical switch may be arranged at the transceiver interface. The second electrical switch may be arranged at the antenna interface. The first electrical switch and the second electrical switch may each have a setting for selecting the TX path. The first electrical switch and the second electrical switch may each have a setting for selecting the RX path. The first electrical switch and the second electrical switch may each have a setting for selecting the bypass path. Thereby, the first electrical switch and the second electrical switch may allow for selecting any one of the TX path, the RX path or the bypass path. The first electrical switch may be arranged at the transceiver side of the module. The first electrical switch may be arranged at the coupling to the transceiver. The second electrical switch may be arranged at the antenna side of the module. The second electrical switch may be arranged at the coupling to the antenna. The first and the second electrical switches may be set such that they may mirror one another. In other words, the same path e.g. the TX path may be selected by the both switches.

In some embodiments, at least one of, preferably both of, the first electrical switch and the second electrical switch are pin-diode switches. Pin diode switches provide a simple design solution, thus making production of the circuitry easier and more cost-efficient, and they are very stable during operation, thus ensuring reliable operation. Finally, pin diode switches have a fast switching time, thus enabling faster switching between the paths. The pin-diode switches may switch from 60 to 170 times in a second. Thereby, the user of the hearing device may notice no voice delay when e.g., having the smartphone in the bag and having a phone call.

In some embodiments, the module may comprise a control unit. The control unit may be configured to control the first electrical switch and the second electrical switch. The control unit may be a logic control unit. The control unit may be coupled to the transceiver of the hearing device. For instance, the control unit may have control lines coupled to the transceiver of the hearing device. The control unit may be configured to select the appropriate path based on a control signal received by the transceiver. For instance, if the signal received by the transceiver is strong, the control unit may select the bypass path. In this case, the control unit may command the first and the second electrical switches to switch to the bypass path. For instance, if the signal received by the transceiver is weak, the control unit may select the TX path and/or the RX path. In this case, the control unit may command the first and the second electrical switches to switch to the TX path and/or RX path.

In some embodiments, the module may comprise a first capacitive unit at the transceiver interface. The module may comprise a first capacitive unit arranged adjacent to the transceiver interface. The module may comprise a first capacitive unit connected to the transceiver interface. In some embodiments, the module may comprise a second capacitive unit at the antenna interface. The module may comprise a second capacitive unit arranged adjacent to the antenna interface. The module may comprise a second capacitive unit connected to the antenna interface. Thereby, the first and the second capacitive units may prevent direct current i.e. DC leakage current from exiting and/or entering the module. The first capacitive unit may comprise at least one capacitor. Alternatively, the first capacitive unit may be a DC blocker. The second capacitive unit may comprise at least one capacitor. Alternatively, the second capacitive unit may be a DC blocker.

In some embodiments, the module may comprise a balanced interface at the transceiver interface. The module may comprise a balanced interface arranged adjacent to the transceiver interface. The module may comprise a balanced interface connected to the transceiver interface. Thus, the module may comprise a balanced interface arranged at the transceiver interface. In other words, an input of the transceiver may comprise a balanced interface. By comprising the balanced interface in the module, a balun component may be omitted from the circuitry. Thereby, it may allow for a smaller and more compact hearing device hybrid, as the balanced interface may be comprised in the module rather than in a separate balun. The balanced interface may comprise a first input/output and a second input/output. The first and the second input/output may have different phases with respect to one another. For instance, the first input/output may be 180° out of phase with respect to the second input/output.

In some embodiments, the module may be a separate chip. The separate chip may be small. The separate chip may have dimensions of 1-2 mm, preferably about 1.6 mm, by 1-2 mm, preferably about 1.2 mm. The separate chip may have a thickness of 3-4 mm, preferably about 0.35 mm. The separate chip may facilitate integrating the module to the hearing device hybrid.

In some embodiments, the module may be integrated into a hearing device hybrid comprising a printed circuit board. Thereby, an improved hearing device may be provided with a lower cost by e.g., saving a cost of a separate chip/space for the module.

In some embodiments the TX amplifier is configured for providing an amplification from 5 dB to 15 dB. In some embodiments the TX amplifier is configured for using less than 20 mA, preferably less than 15 mA during transmission using the TX path. In some embodiments the RX amplifier is configured for providing an amplification from 8 dB to 18 dB. In some embodiments the RX amplifier is configured for using less than 10 mA, preferably less than 5 mA during reception using the RX path. In some embodiments the module is configured for using less than 5 μA, preferably less than 3 μA, more preferably less than 1 μA, when using the bypass path.

For miniature electronic devices, which carries a limited power supply using the TX amplifier may come at a heavy cost of increased power consumption. This is particularly critical for hearing aids, which are essential for their user's ability to communicate with others, and thus should be able to last a full day with the power stored in the power supply. On the other hand, some situations may require and improved wireless link, e.g., using the hearing device as an input/output device during calls. Therefore, it is an advantage to provide the hearing device with TX and RX amplifiers which has the above-mentioned amplification to power consumption ratios as these make it possible to use the TX and RX amplifiers in some situation, while keeping the power consumption at acceptable levels.

In some embodiments the hearing device may comprise a detector unit configured for detecting a signal strength of a received signal and provide a hearing device Received Signal Strength Indicator (RSSI) based on the detected signal strength.

In some embodiments the hearing device may be operable in one or more operational mode(s), wherein the operational mode(s) comprises one or more of a user defined mode, hearing device RSSI mode, an external device RSSI mode, a hearing device/external device RSSI mode, a remaining power supply threshold mode, a remaining operation time mode, and/or an external device type mode. The operational mode may be selected by the user, or it may be preset.

In the user defined mode, the TX path and the RX path are used when transmitting and receiving, respectively, or the bypass path is used when transmitting and receiving depending on an input from the user. The hearing device may comprise a first user interface, e.g., a button or a scroll wheel, configured for providing the user input based on an interaction between the user and the first user interface. The external device may comprise a second user interface, e.g., a GUI in an APP, configured for providing the user input based on an interaction between the user and the second user interface. The user input may be transmitted wirelessly from the external device to the hearing device.

In the hearing device RSSI mode, the TX path and the RX path are used, when transmitting and receiving, respectively, when the hearing device RSSI is below a first threshold, and the bypass path is used, when transmitting and receiving, when the hearing device RSSI is above the first threshold. In the external device RSSI mode, the TX path and the RX path are used, when transmitting and receiving, respectively, when an external device RSSI is below a second threshold, and the bypass path is used, when transmitting and receiving, when the external device RSSI is above the second threshold. In the hearing device/external device RSSI mode, the TX path is used, when transmitting, when the external device RSSI is below a third threshold, and the bypass path is used, when transmitting, when the external device RSSI is above a third threshold. In the hearing device/external device RSSI mode, the RX path is used, when receiving, when the hearing device RSSI is below a fourth threshold, and the bypass path is used, when receiving, when the hearing device RSSI is above the fourth threshold.

In the remaining power supply threshold mode, the TX path and the RX path are used, when transmitting and receiving, respectively, when a remaining power supply capacity, e.g., a remaining battery capacity, is above a fifth threshold, and the bypass path is used, when transmitting and receiving, when the remaining power supply capacity is below the fifth threshold.

In the remaining operation time mode, the TX path and the RX path are used, when transmitting and receiving, respectively, when an estimated remaining operation time is above a sixth threshold, and the bypass path is used, when transmitting and receiving, when the estimated remaining operation time is below the sixth threshold. In some embodiments the signal processor may be configured to provide an estimated remaining operation time based on one or more of: the remaining battery capacity, a current power consumption, power consumption in a current time interval, e.g., the previous thirty minutes, and/or historic data, i.e., data on the user's usage of the hearing device at certain times of the day, at certain geographic locations, etc.

In some embodiments the hearing device comprises a memory storage comprising a list of external devices which require an improved wireless link and a list of external devices which do not require an improved wireless link. In the external device type mode, the path used when transmitting or receiving is chosen based on a whether the external device is of a type on the list of external devices which require an improved wireless link or of a type on the list of external devices which do not require an improved wireless link.

It is noted that the terms "first", "second", "third", etc. are used for labeling and does not imply any particular order, dependency, or importance. Thus, a hearing device configured for operating in the remaining operation time mode will comprise a sixth threshold, but may or may not comprise any of the first to fifth thresholds depending on the operational mode(s) the hearing device is configured to operate in.

The present disclosure relates to the hearing device described above and in the following, and corresponding device parts, each yielding one or more of the benefits and advantages described in connection with the hearing device mentioned, and each having one or more embodiments corresponding to the embodiments described in connection with the hearing device disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
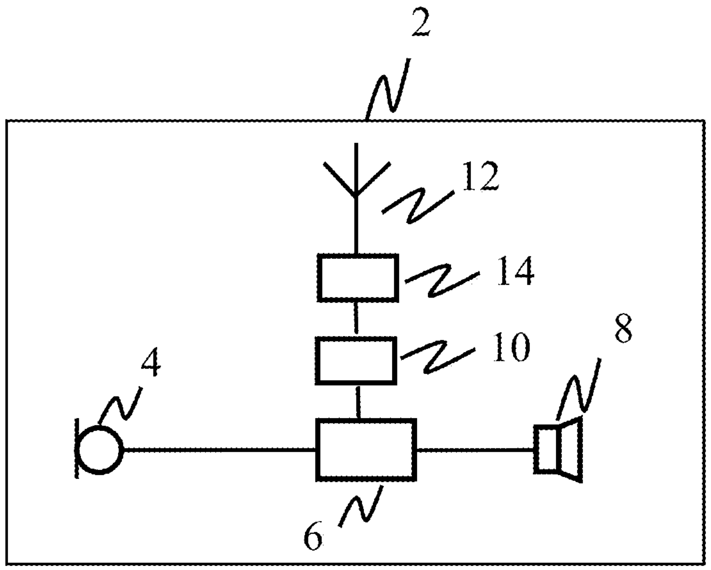
FIG. 1 schematically illustrates an exemplary hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. Throughout, the same reference numerals are used for identical or corresponding parts.

FIG. 1 schematically illustrates an exemplary hearing device 2. The hearing device 2 comprises an input transducer 4. The input transducer 4 generates one or more input signals based on a received audio signal. The hearing device 2 comprises a signal processor 6. The signal processor 6 may be configured for processing the one or more input signals. The hearing device 2 comprises an output transducer 8. The output transducer 8 is coupled to an output of the signal processer 6 for conversion of an output signal from the signal processor into an output signal, e.g. an audio output signal. The hearing device comprises a transceiver 10. The transceiver 10 is coupled to the signal processor 6. The transceiver 10 is configured for wireless data communication. The hearing device 2 comprises a module 14. The module 14 is coupled to the transceiver 10. The hearing device 2 comprises an antenna 12 for emission and reception of an electromagnetic field. The antenna 12 is coupled to the module 14. The module 14 is described in relation to FIG. 3 below.

Figure 2:
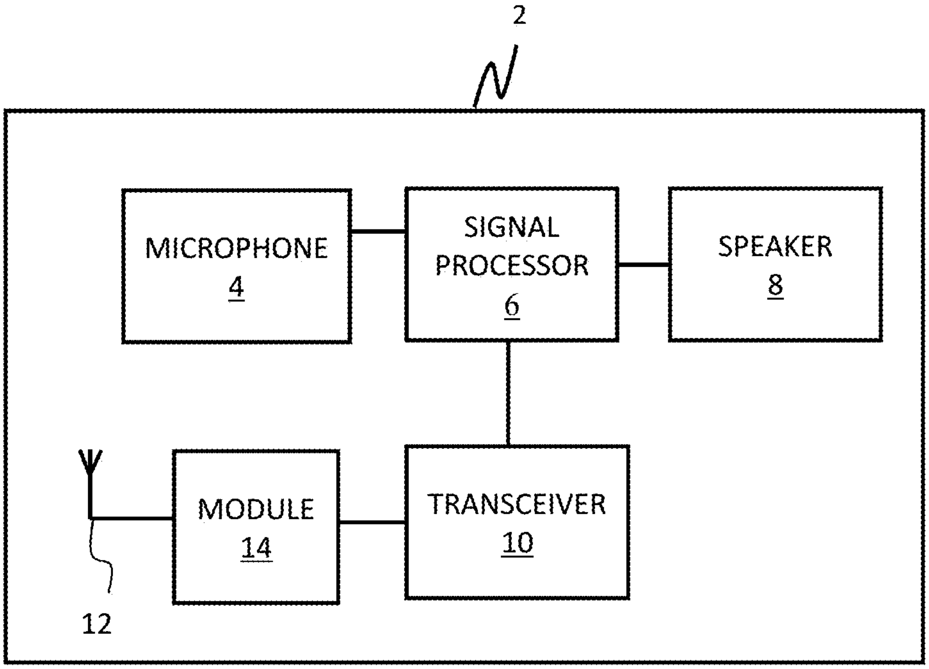
FIG. 2 schematically illustrates a block diagram of an exemplary hearing device.

FIG. 2 schematically illustrates an example of a block-diagram of a hearing device 2. The hearing device 2, shown in FIG. 2, comprises all components of the hearing device 2 shown in FIG. 1. The input transducer 4, shown in FIG. 2, is in the form of a microphone. The output transducer 8, shown in FIG. 2, is in the form of a speaker. In addition, the hearing device 2 may comprise a power source, such as a battery or a rechargeable battery. The hearing device 2 may further comprise a power management unit. The power management unit may be provided for controlling the power provided from the power source to the signal processor 6, the output transducer 8, the input transducer 4, and the transceiver 10.

Figure 3:
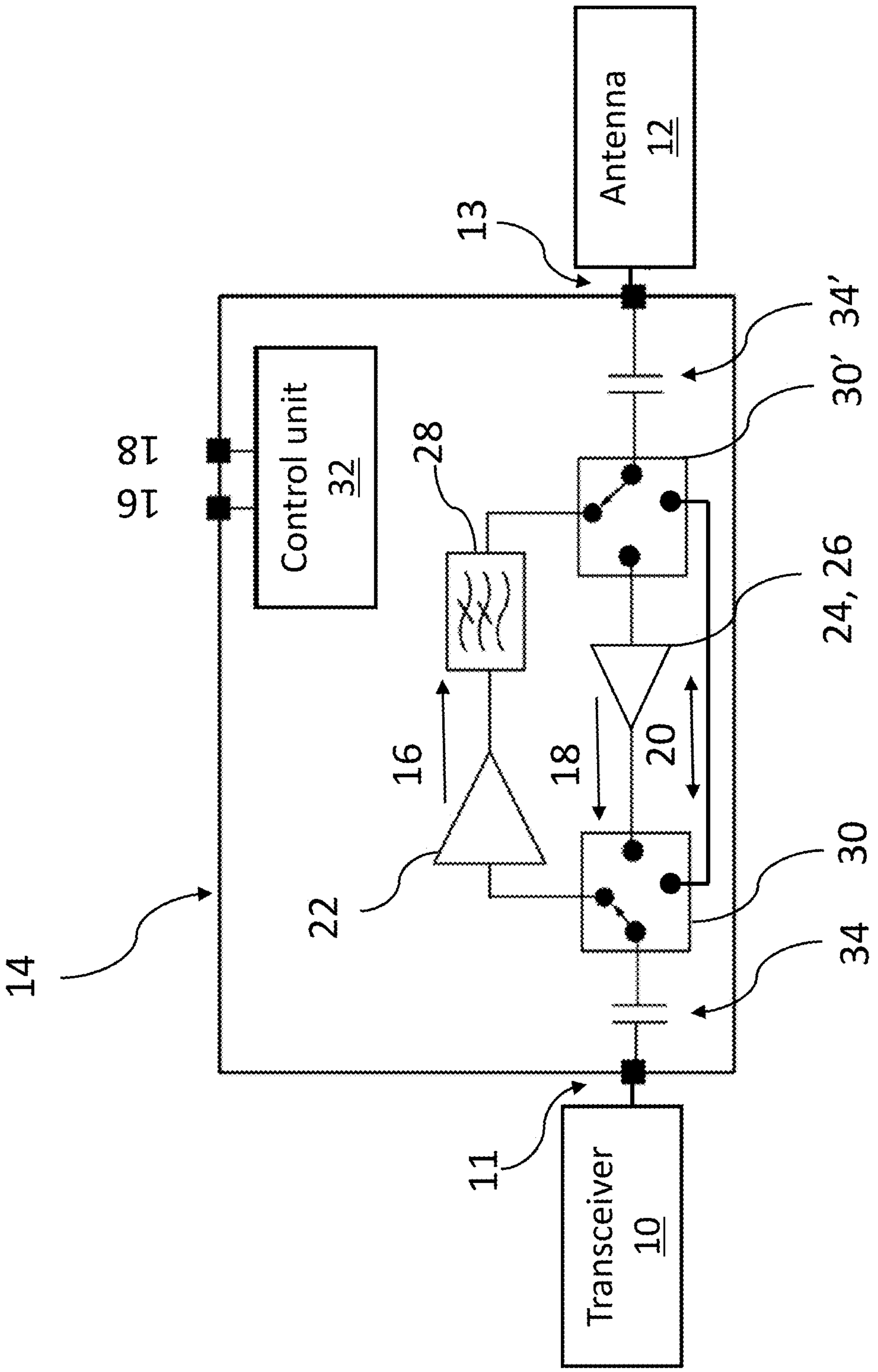
FIG. 3 schematically illustrates an exemplary module.

FIG. 3 schematically shows an exemplary module 14. The hearing device 2 comprises the module 14, shown in FIG. 3. The module 14 comprises a transceiver interface 11 coupled to the transceiver 10. The module 14 comprises an antenna interface 13 coupled to the antenna 12. The module 14 comprises a transmission (TX) path 16. The TX path 16 is configured for sending signals from the transceiver 10 to the antenna 12. The TX path 16 is shown with an arrow in FIG. 3, indicating a direction of the signal from the transceiver 10 to the antenna 12. The TX path 16 comprises a TX amplifier 22. The TX amplifier 22 may be a power amplifier. In addition, the TX path 16 may comprise a filter 28. FIG. 3 shows that the filter 28 is arranged in the TX path 16. FIG. 3 shows that the filter 28 is arranged between the TX amplifier 22 and the antenna interface 13.

FIG. 3 shows that the module 14 comprises a reception (RX) path 18. The RX path 18 is configured for sending signals from the antenna 12 to the transceiver 10. The RX path 18 is shown with an arrow in FIG. 3, indicating a direction of the signal from the antenna 12 to the transceiver 10. The RX path 18 comprises a RX amplifier 24. The RX amplifier 24 may be a low noise amplifier 26.

In addition, the module 14 comprises a bypass path 20. The bypass path 20 is configured for sending signals between the transceiver 10 and antenna 12 by bypassing the TX path 16 and the RX path 18. The bypass path 20 is shown with a double-headed arrow in FIG. 3, indicating directions of the signal from the transceiver 10 to the antenna 12 and vice versa.

FIG. 3 shows that the module 14 comprises a first electrical switch 30 and a second electrical switch 30'. FIG. 3 shows that the first electrical switch 30 may be arranged at the transceiver interface 11. FIG. 3 shows that the second electrical switch 30' is arranged at the antenna interface 13. The first electrical switch 30 and the second electrical switch 30' may each have a setting for selecting the TX path 16. The first electrical switch 30 and the second electrical switch 30' may each have a setting for selecting the RX path 18. The first electrical switch 30 and the second electrical switch 30' may each have a setting for selecting the bypass path 20. At least one of, preferably both of, the first electrical switch 30 and the second electrical switch 30' may be pin-diode switches.

FIG. 3 shows that the module comprises a control unit 32. The control unit 32 may be configured to control the first electrical switch 30 and the second electrical switch 30'. The module 14 may comprise a first capacitive unit 34 at the transceiver interface 11. The module 14 may comprise a first capacitive unit 34 arranged adjacent to the transceiver interface 11. The module 14 may comprise a first capacitive unit 34 connected to the transceiver interface 11. The module 14 may comprise a second capacitive unit 34' at the antenna interface 13. The module 14 may comprise a second capacitive unit 34' arranged adjacent to the antenna interface 13. The module 14 may comprise a second capacitive unit 34' connected to the antenna interface 13. FIG. 3 shows that the first capacitive unit 34 comprises a capacitor. FIG. 3 shows that the second capacitive unit 34' comprises a capacitor.

The control unit 32 may be coupled the transceiver 10 and/or the signal processor 6, which may provide the control unit 32 with a control signal comprising instructions for the settings of the first and second electrical switches 30, 30'. The instructions depend on which operational mode the hearing device 2 is operated in. The operational mode(s) may be selected from one or more of:

- a user defined mode, in which the user decides whether to use the TX and RX paths 16, 18 or the bypass path 20. The user thereby decides whether to have a stronger wireless link to the external device or have lower power consumption;
- hearing device RSSI mode, in which the hearing device 2 switches to the TX and RX paths 16, 18 if the signal quality of received signals falls below a preset threshold;
- an external device RSSI mode, in which the hearing device 2 switches to the TX and RX paths 16, 18 if the signal quality of signals received by the external device falls below a preset threshold, in which case the external device may send a request to the hearing device 2 to boost the wireless link;
- a hearing device/external device RSSI mode, which is a hybrid of the two former mentioned where the hearing device 2 uses the RX path 18, when the quality of signals received by the hearing device 2 falls below and acceptable level, and uses the TX path 16 when requested to do so by the external device;
- a remaining power supply threshold mode, in which the hearing device 2 switches to the TX and RX paths 16, 18 when the power supply has sufficient remaining capacity, such as over 50%, 30%, or 20% remaining capacity;
- a remaining operation time mode, in which the hearing device 2 switches to the TX and RX paths 16, 18 when an estimated remaining operation time is above a preset time, such as 10 hours, 5 hours, 2 hours, 1 hour, or 30 minutes; and/or
- an external device type mode, in which the hearing device 2 switches to the TX and RX paths 16, 18 depending on which type of external device it is connected to. External devices such as laptops or desktops will often have good antenna systems and send strong signal so wireless communication with such devices may be done using less power, i.e., by using the bypass path 20, whereas other external devices, e.g., smartphones or smart watches, may need and improved wireless link to obtain an acceptable link quality.

The user may select which operational mode the hearing device 2 is operating in or the operational mode may be preset, which may be the case in embodiments where only one of the mentioned modes is available or where the hearing device 2 is preset to operate in a mode by the manufacturer or a dispenser.

The module 14 may be a separate chip. The module 14 may be integrated into a hearing device hybrid comprising a printed circuit board.

Figure 4:
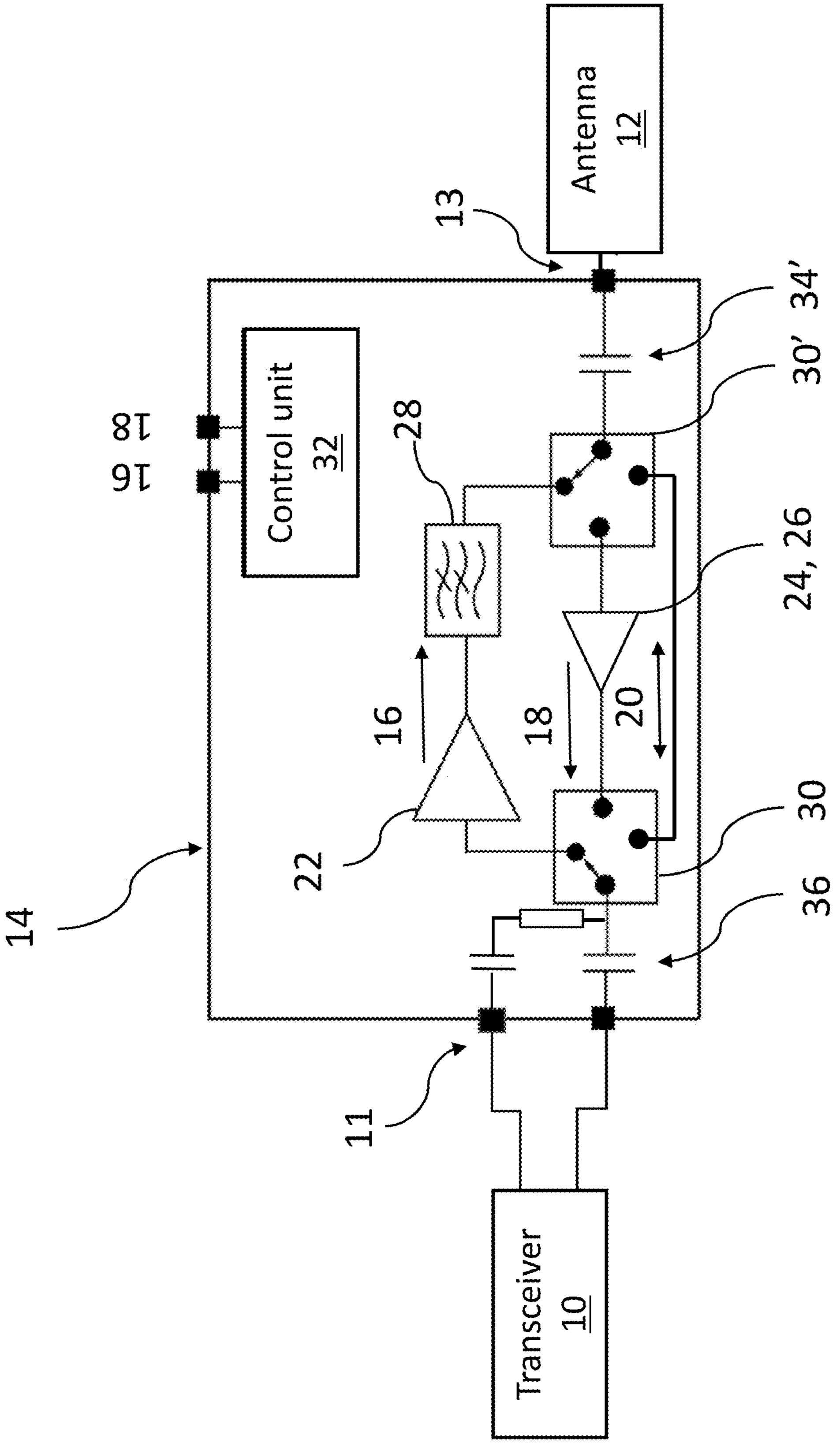
FIG. 4 schematically illustrates an exemplary module comprising a balanced interface.

FIG. 4 shows an exemplary module 14. The hearing device 2 comprises the module 14, shown in FIG. 4. The module 14 comprises a transceiver interface 11 coupled to the transceiver 10. The module 14 comprises an antenna interface 13 coupled to the antenna 12. The module 14 comprises a transmission (TX) path 16. The TX path 16 is configured for sending signals from the transceiver 10 to the antenna 12. The TX path 16 is shown with an arrow in FIG. 4, indicating a direction of the signal from the transceiver 10 to the antenna 12. The TX path 16 comprises a TX amplifier 22. The TX amplifier 22 may be a power amplifier. In addition, the TX path 16 may comprise a filter 28. FIG. 4 shows that the filter 28 is arranged in the TX path 16. FIG. 4 shows that the filter 28 is arranged between the TX amplifier 22 and the antenna interface 13.

FIG. 4 shows that the module 14 comprises a reception (RX) path 18. The RX path 18 is configured for sending signals from the antenna 12 to the transceiver 10. The RX path 18 is shown with an arrow in FIG. 4, indicating a direction of the signal from the antenna 12 to the transceiver 10. The RX path 18 comprises a RX amplifier 24. The RX amplifier 24 may be a low noise amplifier 26.

In addition, the module 14 comprises a bypass path 20. The bypass path 20 is configured for sending signals between the transceiver 10 and antenna 12 by bypassing the TX path 16 and the RX path 18. The bypass path 20 is shown with a double-headed arrow in FIG. 4, indicating directions of the signal from the transceiver 10 to the antenna 12 and vice versa.

FIG. 4 shows that the module 14 comprises a first electrical switch 30 and a second electrical switch 30'. FIG. 4 shows that the first electrical switch 30 may be arranged at the transceiver interface 11. FIG. 4 shows that the second electrical switch 30' is arranged at the antenna interface 13. The first electrical switch 30 and the second electrical switch 30' may each have a setting for selecting the TX path 16. The first electrical switch 30 and the second electrical switch 30' may each have a setting for selecting the RX path 18. The first electrical switch 30 and the second electrical switch 30' may each have a setting for selecting the bypass path 20. At least one of, preferably both of, the first electrical switch 30 and the second electrical switch 30' may be pin-diode switches.

FIG. 4 shows that the module comprises a control unit 32. The control unit 32 may be configured to control the first electrical switch 30 and the second electrical switch 30'. The module 14 may comprise a first capacitive unit 34 at the transceiver interface 11. The module 14 may comprise a first capacitive unit 34 arranged adjacent to the transceiver interface 11. The module 14 may comprise a first capacitive unit 34 connected to the transceiver interface 11. The module 14 may comprise a second capacitive unit 34' at the antenna interface 13. The module 14 may comprise a second capacitive unit 34' arranged adjacent to the antenna interface 13. The module 14 may comprise a second capacitive unit 34' connected to the antenna interface 13. FIG. 4 shows that the first capacitive unit 34 comprises a capacitor. FIG. 4 shows that the second capacitive unit 34' comprises a capacitor.

The module 14, shown in FIG. 4, comprises a balanced interface 36 at the transceiver interface 11. The module 14 may comprise a balanced interface 36 arranged adjacent to the transceiver interface 11. FIG. 4 shows that the module 14 comprises a balanced interface 36 connected to the transceiver interface 11. The balanced interface 36, shown in FIG. 4, comprise a first input/output and a second input/out. The balanced interface may comprise more number of input/outputs. The module 14 may be a separate chip. The module 14 may be integrated into a hearing device hybrid comprising a printed circuit board.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items

1. A hearing device (2) configured to be worn at a user's ear, the hearing device (2) comprising:
   - an input transducer (4) for generating one or more input signals based on a received audio signal;
   - a signal processor (6);
   - an output transducer (8) coupled to an output of the signal processer for conversion of an output signal from the signal processor (6) into an output signal;
   - a transceiver (10) coupled to the signal processor, the transceiver (10) is configured for wireless data communication,
   - an antenna (12) for emission and reception of an electromagnetic field, the antenna (12) is coupled to the transceiver (10),
   - characterized in that the hearing device (2) comprises a module (14), the module (14) comprising:
   - a transceiver interface (11) coupled to the transceiver (10),
   - an antenna interface (13) coupled to the antenna (12),
   - a transmission, TX, path (16) configured for sending signals from the transceiver (10) to the antenna (12), the TX path (16) comprising a TX amplifier (22),
   - a reception, RX, path (18) configured for sending signals from the antenna (12) to the transceiver (10), the RX path (18) comprising a RX amplifier (24), and
   - a bypass path (20) configured for sending signals between the transceiver (10) and antenna (12) by bypassing the TX path (16) and RX path.

2. The hearing device (2) according to item 1, wherein the RX amplifier (24) is a low noise amplifier, LNA (26).

3. The hearing device (2) according to item 1 or 2, wherein the TX amplifier (22) is a power amplifier, PA.

4. The hearing device (2) according to any of the preceding items, wherein the TX path (16) comprises a filter (28) arranged in the TX path (16) between the TX amplifier (22) and the antenna interface (13).

5. The hearing device (2) according to any of the preceding items, wherein the module (14) comprises a match component at the transceiver interface (11).

6. The hearing device (2) according to any of the preceding items, wherein the module (14) comprises a first electrical switch (30) and a second electrical switch (30'), wherein the first electrical switch (30) is arranged at the transceiver interface (11), wherein the second electrical switch (30') is arranged at the antenna interface (13), and wherein the first electrical switch (30) and the second electrical switch (30') each have a setting for selecting the TX path (16), a setting for selecting the RX path (18), and a setting for selecting the bypass path (20).

7. The hearing device (2) according to any of the preceding items, wherein at least one of, preferably both of, the first electrical switch (30) and the second electrical switch (30') are pin-diode switches.

8. The hearing device (2) according to any of the preceding items, wherein the module (14) comprises a control unit (32), the control unit (32) is configured to control the first electrical switch (30) and the second electrical switch (30').

9. The hearing device (2) according to any of the preceding items, wherein module (14) comprises a first capacitive unit (34) at the transceiver interface (11) and/or the module (14) comprises a second capacitive unit (34') at the antenna interface (13).

10. The hearing device (2) according to any of the preceding items, wherein the module (14) comprises a balanced interface (36) at the transceiver interface (11).

11. The hearing device (2) according to any of the preceding items, wherein the module (14) is a separate chip.

12. The hearing device (2) according to any of the preceding items, wherein the module (14) is integrated into a hearing device hybrid comprising a printed circuit board.

LIST OF REFERENCES

2 Hearing device
4 Input transducer
6 Signal processor
8 Output transducer
10 Transceiver
11 Transceiver interface
12 Antenna
13 Antenna interface
14 Module
16 Transmission path
18 Reception path
20 Bypass path
22 TX amplifier
24 RX amplifier
26 Low noise amplifier
28 Filter
30 First electrical switch
30' Second electrical switch
32 Control unit
34 First capacitive unit
34' Second capacitive unit
36 Balanced interface

The invention claimed is:

1. A hearing device configured to be worn at an ear of a user, the hearing device comprising:
- an input transducer configured to provide one or more input signals based on a received audio signal;
- a signal processor configured to provide an output signal;
- an output transducer configured to provide an output transducer signal based on the output signal from the signal processor;
- a transceiver coupled to the signal processor, wherein the transceiver is configured for wireless data communication;
- an antenna for electromagnetic field emission and electromagnetic field reception; and
- a module comprising:
  - a transceiver interface coupled to the transceiver,
  - an antenna interface coupled to the antenna,
  - a transmission path configured for signal transmission from the transceiver to the antenna, the transmission path comprising a transmission amplifier, and
  - a reception path configured for signal transmission from the antenna to the transceiver, the reception path comprising a reception amplifier.

2. The hearing device according to claim 1, wherein the reception amplifier is a low noise amplifier (LNA).

3. The hearing device according to claim 1, wherein the transmission path comprises a filter between the transmission amplifier and the antenna interface.

4. The hearing device according to claim 1, wherein the module comprises a chip.

5. The hearing device according to claim 1, wherein the module is integrated into a hearing device hybrid comprising a printed circuit board.

6. The hearing device according to claim 1, wherein the module comprises a bypass path configured for signal transmission between the transceiver and antenna by bypassing the transmission path and the reception path.

7. The hearing device according to claim 1, wherein the transmission amplifier and the reception amplifier are two distinct individual amplifiers.

8. A hearing device configured to be worn at an ear of a user, the hearing device comprising:

an input transducer configured to provide one or more input signals based on a received audio signal;

a signal processor configured to provide an output signal;

an output transducer configured to provide an output transducer signal based on the output signal from the signal processor;

a transceiver coupled to the signal processor, wherein the transceiver is configured for wireless data communication;

an antenna for electromagnetic field emission and electromagnetic field reception; and a module comprising:

a transceiver interface coupled to the transceiver, an antenna interface coupled to the antenna, a transmission path configured for signal transmission from the transceiver to the antenna, the transmission path comprising a transmission amplifier, and a reception path configured for signal transmission from the antenna to the transceiver, the reception path comprising a reception amplifier;

wherein the module comprises a first electrical switch and a second electrical switch, wherein the first electrical switch is at the transceiver interface, wherein the second electrical switch is at the antenna interface, and wherein each of the first electrical switch and the second electrical switch has a first setting for selecting the transmission path, and a second setting for selecting the reception path.

9. The hearing device according to claim 8, wherein at least one of the first electrical switch and the second electrical switch is a pin-diode switch.

10. The hearing device according to claim 8, wherein the module comprises a control unit, the control unit configured to control the first electrical switch and the second electrical switch.

11. A hearing device configured to be worn at an ear of a user, the hearing device comprising:

an input transducer configured to provide one or more input signals based on a received audio signal;

a signal processor configured to provide an output signal;

an output transducer configured to provide an output transducer signal based on the output signal from the signal processor;

a transceiver coupled to the signal processor, wherein the transceiver is configured for wireless data communication;

an antenna for electromagnetic field emission and electromagnetic field reception; and a module comprising:

a transceiver interface coupled to the transceiver, an antenna interface coupled to the antenna, a transmission path configured for signal transmission from the transceiver to the antenna, the transmission path comprising a transmission amplifier, and a reception path configured for signal transmission from the antenna to the transceiver, the reception path comprising a reception amplifier;

wherein the module comprises a first capacitive unit at the transceiver interface and/or wherein the module comprises a second capacitive unit at the antenna interface.

12. A hearing device configured to be worn at an ear of a user, the hearing device comprising:

an input transducer configured to provide one or more input signals based on a received audio signal;

a signal processor configured to provide an output signal;

an output transducer configured to provide an output transducer signal based on the output signal from the signal processor;

a transceiver coupled to the signal processor, wherein the transceiver is configured for wireless data communication;

an antenna for electromagnetic field emission and electromagnetic field reception; and a module comprising:

a transceiver interface coupled to the transceiver, an antenna interface coupled to the antenna, a transmission path configured for signal transmission from the transceiver to the antenna, the transmission path comprising a transmission amplifier, and a reception path configured for signal transmission from the antenna to the transceiver, the reception path comprising a reception amplifier;

wherein the module comprises a balanced interface at the transceiver interface.

13. A hearing device configured to be worn at an ear of a user, the hearing device comprising:

an input transducer;

an output transducer;

a processing unit coupled between the input transducer and the output transducer;

a transceiver coupled to the processing unit, wherein the transceiver is configured for wireless data communication;

an antenna for electromagnetic field emission and electromagnetic field reception;

a transceiver interface coupled to the transceiver;

an antenna interface coupled to the antenna;

a transmission path configured for signal transmission from the transceiver to the antenna, the transmission path comprising a transmission amplifier;

a reception path configured for signal transmission from the antenna to the transceiver, the reception path comprising a reception amplifier; and a bypass path bypassing the transmission path and the reception path, wherein the bypass path is bi-directional.

14. The hearing device according to claim 13, wherein the reception amplifier is a low noise amplifier (LNA).

15. The hearing device according to claim 13, further comprising a match component at the transceiver interface.

16. The hearing device according to claim 13, wherein the transmission path and the reception path are parts of a hearing device hybrid comprising a printed circuit board.

17. The hearing device according to claim 13, wherein the bypass path is configured for signal transmission between the transceiver and antenna.

18. A hearing device configured to be worn at an ear of a user, the hearing device comprising:

an input transducer;

an output transducer;

a processing unit coupled between the input transducer and the output transducer;

a transceiver coupled to the processing unit, wherein the transceiver is configured for wireless data communication;

an antenna for electromagnetic field emission and electromagnetic field reception;

a transceiver interface coupled to the transceiver;

an antenna interface coupled to the antenna;

a transmission path configured for signal transmission from the transceiver to the antenna, the transmission path comprising a transmission amplifier;

a reception path configured for signal transmission from the antenna to the transceiver, the reception path comprising a reception amplifier; and a first capacitive unit at the transceiver interface and/or a second capacitive unit at the antenna interface.

19. A hearing device configured to be worn at an ear of a user, the hearing device comprising:

an input transducer;

an output transducer;

a processing unit coupled between the input transducer and the output transducer;

a transceiver coupled to the processing unit, wherein the transceiver is configured for wireless data communication;

an antenna for electromagnetic field emission and electromagnetic field reception;

a transceiver interface coupled to the transceiver;

an antenna interface coupled to the antenna;

a transmission path configured for signal transmission from the transceiver to the antenna, the transmission path comprising a transmission amplifier;

a reception path configured for signal transmission from the antenna to the transceiver, the reception path comprising a reception amplifier; and a balanced interface at the transceiver interface.

20. A hearing device configured to be worn at an ear of a user, the hearing device comprising:

an input transducer;

an output transducer;

a processing unit coupled between the input transducer and the output transducer;

a transceiver coupled to the processing unit, wherein the transceiver is configured for wireless data communication;

an antenna for electromagnetic field emission and electromagnetic field reception;

a transceiver interface coupled to the transceiver;

an antenna interface coupled to the antenna;

a transmission path configured for signal transmission from the transceiver to the antenna, the transmission path comprising a transmission amplifier;

a reception path configured for signal transmission from the antenna to the transceiver, the reception path comprising a reception amplifier; and a first electrical switch and a second electrical switch, wherein the first electrical switch is at the transceiver interface, wherein the second electrical switch is at the antenna interface, and wherein each of the first electrical switch and the second electrical switch has a first setting for selecting the transmission path, and a second setting for selecting the reception path.

21. The hearing device according to claim 20, wherein at least one of the first electrical switch and the second electrical switch is a pin-diode switch.

22. The hearing device according to claim 20, further comprising a control unit, the control unit configured to control the first electrical switch and the second electrical switch.

* * * * *